Sept. 7, 1954     W. E. KOCK     2,688,732
WAVE GUIDE
Filed May 5, 1949     2 Sheets-Sheet 1
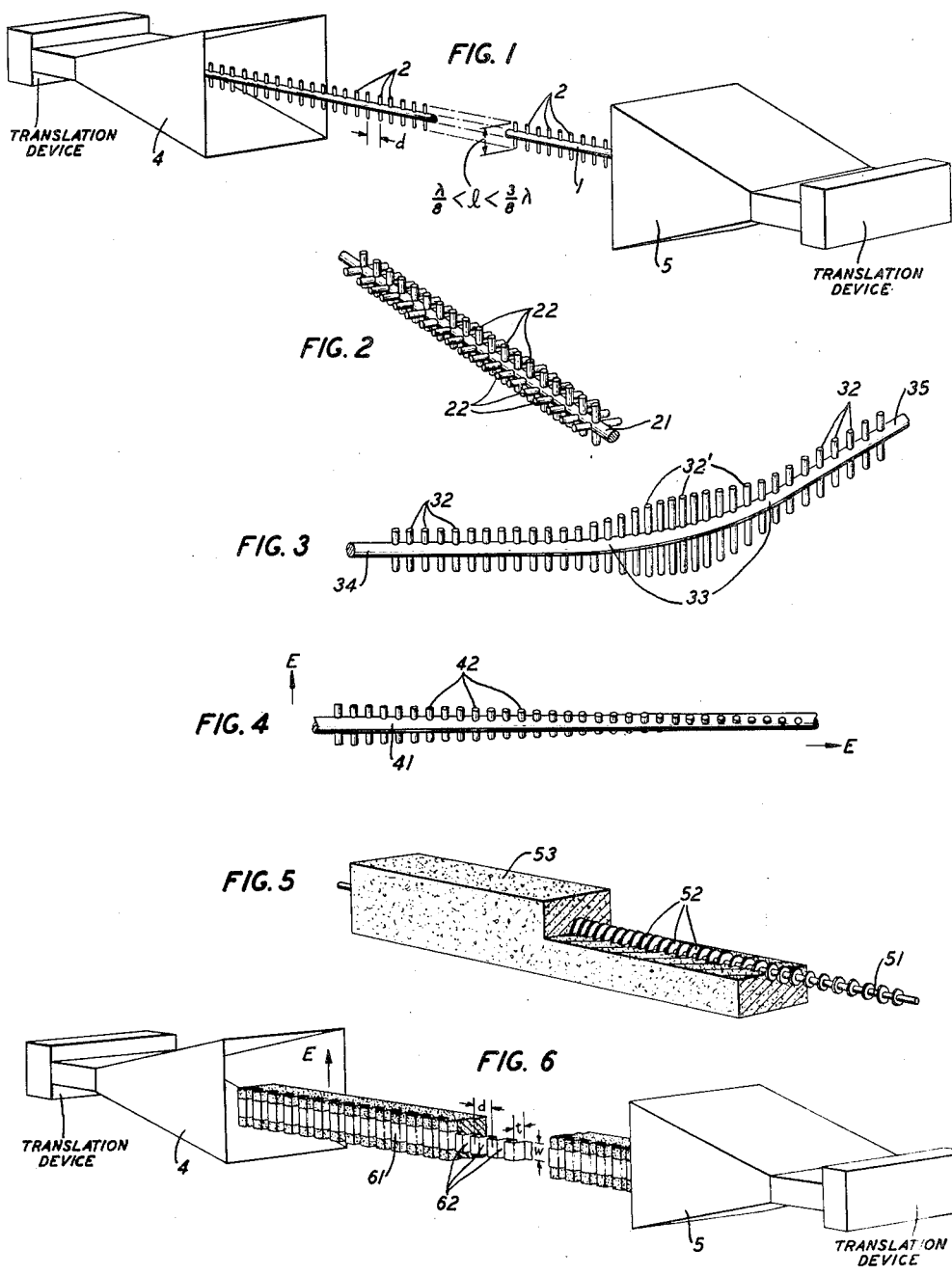
INVENTOR
W. E. KOCK
BY
N. D. Ewing
ATTORNEY Sept. 7, 1954 W. E. KOCK 2,688,732
WAVE GUIDE
Filed May 5, 1949 2 Sheets-Sheet 2

INVENTOR
W. E. KOCK
BY
N. D. Ewing
ATTORNEY

Patented Sept. 7, 1954

2,688,732

UNITED STATES PATENT OFFICE 2,688,732

WAVE GUIDE

Winston E. Kock, Basking Ridge, N. J., assignor to Bell Telephone Laboratories, Incorporated, New York, N. Y., a corporation of New York Application May 5, 1949, Serial No. 91,573

4 Claims. (Cl. 333—95)

This invention relates to electromagnetic wave guides and wave guide systems.

An object of the invention is to provide a wave guide comprising arrays of regularly spaced metallic pins, which simulate dielectric structures in respect to their propagational characteristics and guiding effects on electromagnetic waves, the spacing and length of the elements being small with respect to the propagated wavelength.

Another object of the invention is to provide arrays of regularly spaced metallic elements as guides and associated components in the range of wavelengths, such as millimeters, where the fabrication and use of hollow pipe wave guides become unfeasible.

Further objects of the invention are electromagnetic wave transmission and reception, phase adjustment, power division, mode conversion and the like.

In accordance with various embodiments of the invention, guiding structures for transverse electromagnetic waves comprising longitudinal metallac ribbons, rods, wires or the like, are provided with regularly spaced, symmetrically disposed, transverse elements, such as pins, corrugations or dipole-like elements arranged as in a linear array. The length and spacing of the transverse elements are small, of the order of a quarter wavelength or less, with respect to the propagated wave. The energy of the transverse electromagnetic waves, which would normally tend to spread out in space and decrease in density, is instead concentrated along the guiding structures of the invention with the field strength decreasing exponentially away therefrom. The concentrated wave energy follows or hugs the metallic guide even though it be curved, bent or warped. The free space electromagnetic waves in the presence of the guiding structures of the invention are truly "guided waves" even though they are not fully confined within physical boundaries. Essentially, the wave energy is bound close to the guiding metallic structures with very little radiation loss, whereby they are suited to long line propagation in lieu of hollow pipes or as links and adjuncts to radio relay systems and conventional wave guide lines. Particularly, in the millimeter range of wavelengths, their simplicity and ease of manufacture recommend their use in lieu of hollow pipes and the like.

In one particular form, arrays of metallic, parallel pins are arranged on a rod or the like to produce a guiding effect on linearly polarized free space or TEM mode waves, similar in character to the guiding properties of dielectric rods or tubes, known as "Polyrods."

Short lengths of the guiding structures in accordance with the invention may be utilized as wave guide components, such as phase shifters, delay devices, mode converters, power dividers, etc. for use in conventional wave guide, radio relay systems or with the long pin arrays described; and particularly, for the millimeter wavelength range.

My United States application, Serial No. 91,572, and Serial No. 748,448, filed May 16, 1947, now Patents 2,579,324 and 2,577,619 respectively, describe metallic arrays arranged to focus, refract and deflect electromagnetic waves.

My United States application, Serial No. 91,572, now Patent 2,663,797, filed concurrently herewith describes metallic arrays arranged as antennas and end-fire radiators.

My United States application, Serial No. 91,571, filed concurrently herewith describes structures of regularly spaced elements for guiding compressional waves and the like.

The present application is concerned with wave guiding metallic pins or ribbon arrays as transmission lines of considerable length and with components thereof of short length for use as phase shifters, power dividers, mode converters and the like, preferably in the microwave and millimeter range.

Referring to the figures of the drawings:

Fig. 1 shows a wave guiding rod with the short transverse equispaced metallic pins thereon in a communication system;

Fig. 2 shows a modification suitable for mutually perpendicular linear polarizations;

Fig. 3 shows a curve or bend in a wave guide rod;

Fig. 4 shows a progressive spiral twist along a wave guiding pin array;

Fig. 5 shows regularly spaced discs embedded in a dielectric block;

Fig. 6 shows a guiding ribbon with sinuosities therein used in a communication system;

Figure 7:
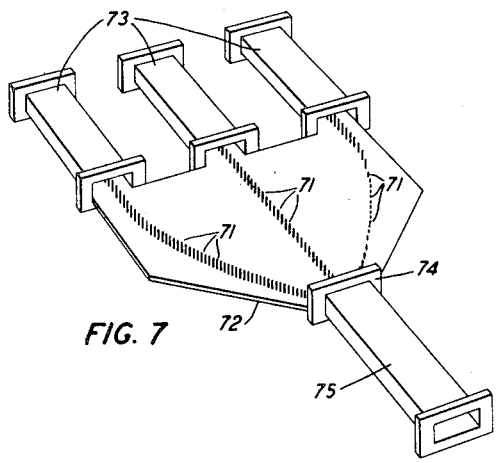
Fig. 7 shows a power divider.

Fig. 1 shows a wave guide for electromagnetic waves comprising a longitudinal metallic rod 1 having an array of short metallic pins 2, parallel to each other and transversely connected to the rod, and spaced at equal or regular intervals $d$ therealong. The rod 1 may be of a length suitable for long transmission line use, of the order of miles, or for component use, may be of the order of feet or inches, as in a phase shifter, power divider or wave mode converter. The pins 2 and rod 1 may be of copper, brass or any other good electrically conducting substance.

Free space or transverse electromagnetic waves may be launched onto the guide rod 1 and pin array 2 by means of an electromagnetic transmitting horn 4. In this arrangement, the transmitted waves are guided when they are linearly polarized at the mouth of the transmitting rectangular horn so that the electric vector is parallel to the pins 2. Similarly, the waves received may be picked off the rod 1 by a distant receiving horn 5, having similarly a rectangular cross-section, whereby the received wave at the horn is linearly polarized. Each of the horns may be connected to a conventional rectangular or cylindrical hollow pipe with suitable translation apparatus therein for further transmission therealong.

The total length of the pins 2 should preferably be between the limits of $$\frac{\lambda}{8} \text{ and } \frac{3\lambda}{8}$$

and for efficient guiding and concentration of wave energy, the spacing $d$ should be $$\frac{\lambda}{4}$$

or less. The closer the spacing, the better is the concentration of the energy along the guiding rod structure.

Fig. 2 shows a wave guiding rod suitable for use with two linear polarizations mutually perpendicular to each other. In this case, the single pins of Fig. 1 are replaced by crossed, symmetrically disposed pins 22 perpendicular to each other and connected to rod 21 at regularly spaced intervals therealong. The length and spacing of the cross-pins are governed by the same rules as disclosed for Fig. 1.

By way of example, in one tested embodiment of guide rods as shown in Figs. 1 and 2 and designed for a mean wavelength of $\lambda=3.2$ centimeters corresponding to 1.26 inches, the diameter of the rod 1, the length and spacing of the pins 2 were $\frac{1}{8}$, $\frac{5}{16}$, $\frac{1}{8}$ inch respectively.

Where the direction of polarization is a random distribution, one may use transverse circular metal discs (Fig. 5) connected to the rod and regularly spaced in the manner previously described for the pin array. All these forms and, more particularly, the disc form are arranged to guide free space electromagnetic or TEM waves, and are to be distinguished from corrugated wave guides employing special wave modes requiring pipes or tubes for their development, such as the transverse magnetic TM mode, the longitudinal electromagnetic LEM mode or the transverse electric TE mode.

The guide rods shown heretofore may be supported above ground by wooden posts or the like, or may be used in underground conduits encased in polystyrene sheaths for protection against corrosion, moisture and breakage.

These wave guiding rods are useful in low-loss transmission systems per se or in conjunction with conventional wave guide or radio relay systems. As in a dielectric wire, waves will be guided by and bound to the pin array. For "loosely" bound waves, most of the energy exists and travels in a cylindrical region extending quite a distance from the rod. Copper losses, i. e. heat or dissipation losses in the guiding rods are small and a low-loss transmission circuit is obtained. At wavelengths of 3.3 centimeters, the loss of a line consisting of $\frac{3}{8}$ inch copper pins spaced $\frac{3}{8}$ inch apart was under 0.1 decibels per meter.

It was observed experimentally that only very gradual bends or changes in direction were permitted with the rod of Fig. 1 and to permit more rapid bends, the unit shown in Fig. 3 was constructed. Here the pins taper up to larger size and closer proximity so that the wave progressively becomes bound more tightly to the rod as the middle curved section is approached, permitting more abrupt bends to be made in this section. Long distance circuits may thus be composed of long, straight, low-loss sections with moderately abrupt bends occurring in short, higher-loss sections of this type.

Fig. 3 shows such a guiding rod structure with a bend or curve therein. This corresponds to a curved wave guide or a bend in the conventional hollow pipe. Electromagnetic waves will be confined and prevented from spreading even in a curved rod structure as in Fig. 3, if the bend is not too abrupt. Where moderately abrupt bends are used, the pins 32 should be placed closer together along the curve 33 as shown by 32' in Fig. 3. The pins 32' should be slightly longer at the bend than in the straight sections 34, 35 so as to insure that the waves are concentrated close to the guiding rod structure. This again corresponds to the dielectric wave guide where it has been known that bends in the dielectric filaments or rods will produce less radiation loss if the dielectric material is made thicker along the curved section.

Fig. 4 shows a structure wherein the metallic pins 42 acquire an axial or spiral twist as they progress along the supporting structure. If this twist is made gradually, along a suitable length of rod 41, it can cause the electric vector E to be rotated by 90 degrees or any other desired amount as shown in Fig. 4. This feature is useful in some of the mode converter structures to be described.

Fig. 5 shows a rod 51 having metallic circular discs 52 symmetrically disposed thereon, and regularly spaced therealong, the diameters and spacing being arranged in the manner defined heretofore in connection with Fig. 1. A polystyrene block 53, which may be buried underground, encases the rod 51 to prevent corrosion, maintain the proper alignment and prevent distortion. Free space waves are guided therealong and the concentrated energy is prevented from spreading and being dissipated. There is no need in the contemplated use of this structure to generate or establish special modes of wave propagation.

Fig. 6 shows a guiding ribbon-like structure, which exhibits an equivalent high dielectric constant characteristic when viewed as a simulating or artificial dielectric, and hence displays a highly effective guiding effect for the amount of conducting material employed. A continuous strip or ribbon 61 of copper foil is bent into regular, rectangularly shaped sinuosities 62, whose slot width $l$, depth $T$ are preferably equal and small with respect to the wavelength. In one tested exemplary embodiment, the dimensions of the ribbon guide for a wavelength of 1.3 inches, were:

$T$ (slot depth) = ¼ inch
$l$ (slot width) = ¼ inch
$d$ (spacing between slots) = 5/16 inch
$w$ (width of ribbon) = ½ inch Since the width of ribbon is analogous to the length of pin in the previous structures, it should be less than $$\frac{\lambda}{2}$$

and preferably between $$\frac{\lambda}{8} \text{ and } \frac{3\lambda}{8}$$

Although similar in appearance to a corrugated wave guide, the ribbon guide has been found effective only when the wave polarization is parallel to the corrugations, i. e., lying in the plane of the ribbon and transverse to its longitudinal axis, rather than perpendicular thereto as in the corrugated guide. It was found that when the polarization was directed perpendicular to the corrugations or to the plane of the ribbon, the guiding effect was inappreciable. This critical behavior with respect to the incoming polarization was unexpected.

The transmitting and receiving horns 4 and 5 respectively have rectangular openings and provide linear polarizations E parallel to the small or $b$ side of the rectangle. The direction of these linear polarizations in relation to the guiding ribbon 61 is such that E is parallel to the plane of the ribbon, extends transversely thereacross through the top and bottom openings of the slots.

The guiding rod structures may be supported above ground as described heretofore, or they may be mounted on a grounding plate which may be more desirable in some cases.

Power dividers

Fig. 7 shows a power divider for hollow wave guides, which utilizes the guiding effect of a pin array. Here three separate rows of vertical pins 71 are mounted on a metallic base or ground plate 72, with the rows of pins continued in length to extend into three wave guide pipes 73, respectively. The three rows of vertical pins mounted in the metal plate 72 form guiding "channels" which cause the energy emerging from the rectangular wave guide 75 to split and enter the three branching rectangular wave guides 73. It is thus a power divider and division is accomplished at the junction 74.

Figure 8:
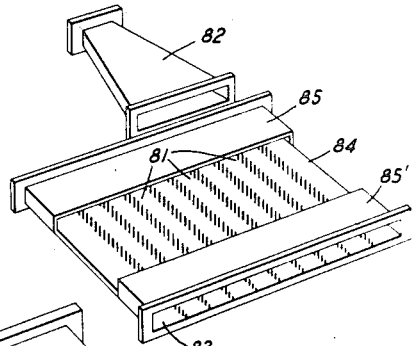
Fig. 8 shows a linear scanning antenna.

Fig. 8 shows a linear scanning antenna comprising many parallel rows of pins 81. A wave emerging from the sectoral horn 82 is launched on to these rows of pins. Then, by moving the sectoral horn at the rear of the power divider 85, 85' from right to left, the wave appearing at the front opening 83 of the base plate member 84 is also caused to move from left to right, so that the radiated energy appears to come from a similar imaginary horn moving at the front opening. By curving the linear rear opening around into a circle and using a curved feed horn, a circular motion of the feed becomes a one-way linear motion at the front opening. This is desirable in certain linear scanning radar antennas where the feed is moved behind a lens.

Phase shifter

Figure 9:
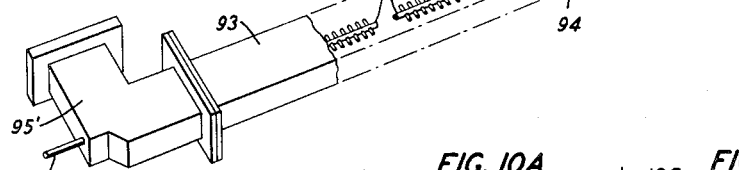
Fig. 9 shows a phase shifter.

Fig. 9 shows a wave guide phase shifter. Here a row of pins 92 mounted on a rotatable longitudinal rod 91 may be enclosed in a wave guide section 93 to provide an adjustable phase shifter. When the pins 92 are horizontal as shown, that is, perpendicular to the electric vector E, they have a negligible effect upon the progress of the electromagnetic wave inside the wave guide 93. When however, the longitudinal rod 91 which has its bearings in end sections 95, 95, is rotated, the array of small pins exerts a greater effect in delaying the wave until a maximum delay or phase shift is reached when the pins are parallel to the electric vector. The full delaying effect is comparable in magnitude to filling the guide with polystyrene, and maximum phase shift is observed between the input and output sections of the wave guide.

The terminals of the longitudinal rod 91 are tapered for impedance matching purposes by making the end pins 94 progressively smaller toward the ends of the rod. These phase shifters are adapted to produce larger phase shifts than is obtainable by conventional types and may be employed in linear scanning antennas, for example, where small external antennas or dipoles are coupled into a wave guide at various points along its length as in the United States application of H. C. Hey, Serial No. 621,580, filed October 10, 1945, now Patent 2,527,817. The radiated beam produced can be shifted in direction by the varying phase shift (Musa action) contributed by the rotatable phase shifter of Fig. 9, and the scanning so provided may be simpler than the wave guide squeezing mechanism now used in the scaning antenna just mentioned.

Mode converters

It is often desired to convert from one mode to another, and in particular, from a higher order mode which may be easily established to a second higher order mode which may be more difficult to produce.

Figures 10A, 10B, 10C:
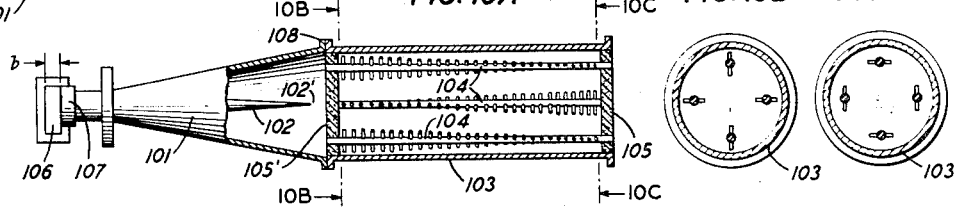
Fig. 10A shows a side view partly in elevation of a mode converter.
Figs. 10B and 10C show end sections of the converter of Fig. 10.

For mode conversion, the twisted guide structure of Fig. 4 may be effectively employed in hollow wave guides which are relatively large in diameter for propagating special higher order modes. An example of such a mode converter is shown in Fig. 10A.

Mode conversion to a $TE_{01}$ mode is accomplished by the twisted guide section 103 on an incoming $TM_{01}$ mode established in coaxial conductor section 101.

Initially, an input wave from rectangular wave guide having its polarization E parallel to the small dimension $b$ is converted into a coaxial mode as a preliminary step. For this purpose a wave guide-to-coaxial transition 107 of well-known construction is provided at one end of the coaxial line 101, 102. At the opposite end thereof, the inner coaxial conductor 102 tapers down to a launching terminal 102', while the outer coaxial, conical conductor 101 expands outwardly in cross-section toward flange member 108. When so enlarged, the tube 101 can then propagate the coaxial mode or the $TM_{01}$ mode into wave guide 103, without further need of a coaxial system. The $TM_{01}$ mode thus produced can in accordance with the invention be converted, however, to the more desirable mode, namely, the circular electric or $TE_{01}$ mode suitable for low-loss wave guide transmission. In this latter mode the electric lines are circles, whereas in the $TM_{01}$ mode the electric lines are all radial. In Fig. 10A, accordingly, when the $TM_{01}$ (coaxial) mode is launched into the end of the cylindrical guide 103, its electric vectors $E_1$ are radial and parallel to four radial dipole arrays 104 shown in Fig. 10B. Each of the pin arrays 104, however, has a progressive clockwise twist amounting to 90 degrees in the full length of the rod as evidenced by a comparison of Figs. 10B and 10C and the comparative orientation of the end pins therein. The originally radial electric vectors are thus rotated 90 degrees to become parallel to the walls of the guide and produce the circular electric ($TE_{01}$) mode. Accordingly, a twisted array of pins 104 of the type disclosed in Fig. 4, wherein the pin array suffers a gradual 90-degree right-hand twist progressing from the beginning of the array to the end, is employed for the mode conversion. Fig. 10C shows the end pins at the output end of tube 103 rotated 90 degrees in orientation in each of the four quadrants of the cylindrical tube 103. Each of four twisted guide structures 104 is supported by dielectric wafers 104, 105'.

The $TM_{01}$ wave guide mode with its electric vector $E_1$ radial having been launched from the conical member 101 onto the twisted rods, its component waves are guided along the individual rods 104 and progressively have their polarizations rotated by 90 degrees. At the far end of the twisted guides 104, the electric vectors $E_2$ of the four guided waves, respectively, have finally become tangent to the end wall of the cylinder 103 and a circular $TE_{01}$ electric mode is thus produced. The utility of this circular electric wave guide mode for low-loss long distance transmission may depend largely on the efficiency of converters such as described.

Figure 11:
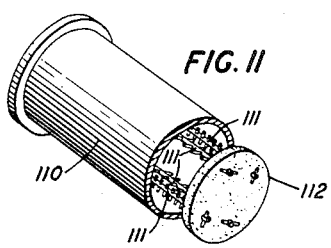
Figs. 11 and 12 show various other forms of mode converters.

A similar mode conversion can be effected with untwisted rows of pins similar to those shown in Fig. 1, if the pins are oriented at 45 degrees to a diameter of the cylinder, as shown in the modification illustrated in Fig. 11. It has been demonstrated in my copending United States application Serial No. 748,448, filed May 16, 1947, now Patent 2,577,619, that arrays of pins can cause a 90-degree rotation of the electric vector if the pins are oriented at 45 degrees to the electric vector and if the pin array is made of sufficient thickness. Accordingly, in the case at hand, four guiding rods 111 as in Fig. 1 are inserted in the cylindrical tube 110 and made of the proper lentgh so that the radial electric field lines of the $TM_{01}$ wave entering the cylinder are converted to the tangential lines corresponding to the circular electric mode $TE_{01}$. The mode converting cylinder 110 is intended to replace the cylinder 103 in the system of Fig. 10A. Dielectric wafers 112 shown removed support the untwisted pin array 111.

Figure 12:
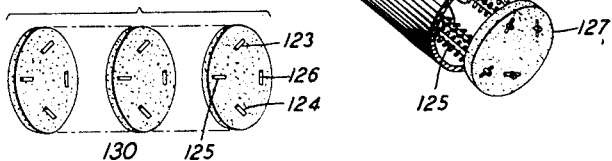

Fig. 12 shows a method of accomplishing this same mode conversion directly from an ordinary wave guide mode as contrasted to the coaxial mode employed in Figs. 10A and 11. Initially, the input polarization $E_1$, derived from the rectangular wave guide 12D is established perpendicular to the $a$ dimension, and since the polarization direction does not change in its progress through conical section 121 and cylindrical guide 122, it appears at the input mouth of the cylinder 122 with its electric vector components vertical in the four quadrants. The four pin arrays 123, 124, 125, 126 are oriented, as shown in the partially removed wafer supports, at 45 degrees only in the top and bottom quadrants, and are horizontal and vertical, respectively, in the left and righthand quadrants. This arrangement again produces a satisfactory conversion of a $TM_{01}$ mode to a $TE_{01}$ mode.

It should be understood that the metallic rods merely act as supports for the metallic pins, and that the pins simulate molecular dipoles in a homogeneous medium. The pins may even be supported on dielectric rods or embedded in polystyrene foam or in other low-loss dielectric wafers.

Figure 13:
Fig. 13 shows metallic pins embedded in dielectric wafers.

Fig. 13 shows a set of polystyrene wafers adapted to be aligned and assembled in a retaining tube or the like, to provide a guiding structure similar to the four untwisted rod assembly for mode conversion illustrated in Fig. 12. Each wafer 130 has embedded therein four metallic pins oriented in the manner shown in Fig. 12. In their assembled relation, the wafers and pins are so aligned as to provide four separate longitudinal arrays of pins 123, 124, 125, 126 whose function and operation as a mode converter are exactly like that shown in Fig. 12.

My concurrently filed application Serial No. 91,571 has disclosed similar periodic structures for guiding compressional waves.

It should be understood that it is within the purview of the invention to utilize the various periodic structures disclosed herein and in my aforementioned concurrently filed applications for the simultaneous propagation and guidance of microwaves and compressional waves of the same wavelentgh through the use of suitable generators and receivers of both sound and microwaves properly coupled to said periodic structures.

What is claimed is:

1. In combination, two hollow pipe wave guides having linearly polarizing cross-sections spaced apart, a medium therebteween adapted to propagate free space waves, and a transmission line between said guides, said line comprising a series of equispaced, symmetrical dipole elements having a spacing less than a quarter wavelength contained in said medium, the dimensions of said elements being small with respect to the propagated wavelength, whereby to confine the propagated waves along said line.

2. A low-loss, wave-guiding element for free space electromagnetic waves comprising a lineal rod having rows of regularly spaced, parallel metallic pins extending an equal distance perpendicular thereto for symmetrically coupling to said space waves, the length of each pin being in the range between $$\frac{\lambda}{8} \text{ and } \frac{3\lambda}{8}$$

and their parallel spacing being less than $$\frac{\lambda}{4}$$

whereby the concentration of the wave energy is along said guiding rod, wherein $\lambda$ is the free space wavelength and a source of waves polarized linearly with the electric vector parallel to said pins, said source being coupled to said rod.

3. A low-loss wave guide for linearly polarized, free space electromagnetic waves comprising a longitudinal metallic rod having a regular array of short metallic pins parallel to each other and transversely connected to said rod, said pins being directly and symmetrically coupled to the free space waves to bind the wave energy along said rod, the length of each pin being in the range between $$\frac{\lambda}{8} \text{ and } \frac{3\lambda}{8}$$

and the spacing thereof being less than $$\frac{\lambda}{4}$$

where $\lambda$ is the free space wavelength and a source of waves polarized linearly with the electric vector parallel to said pins, said source being coupled to said rod.

4. A low-loss wave guide for linearly polarized, free space electromagnetic waves comprising a longitudinal rod having a regular array of parallel equispaced, symmetrical dipole elements having a spacing less than $$\frac{\lambda}{4}$$

and coupled to said waves to maintain the linear polarization thereof, the overall length of each element being in the range between $$\frac{\lambda}{8} \text{ and } \frac{3\lambda}{8}$$

where $\lambda$ is the free space wave length, and a source of waves polarized linearly with the electric vector parallel to said dipole elements, said source being coupled to said rod.

References Cited in the file of this patent

UNITED STATES PATENTS

| Number | Name | Date |
|---|---|---|
| 2,129,712 | Southworth | Sept. 13, 1938 |
| 2,192,532 | Katzin | Mar. 5, 1940 |
| 2,271,300 | Lindenblad | Jan. 27, 1942 |
| 2,316,151 | Barrow | Apr. 13, 1943 |
| 2,425,887 | Lindenblad | Aug. 19, 1947 |
| 2,438,119 | Fox | Mar. 23, 1948 |
| 2,438,795 | Wheeler | Mar. 30, 1948 |
| 2,455,888 | Brown | Dec. 7, 1948 |
| 2,532,317 | Lundstrom | Dec. 5, 1950 |
| 2,588,610 | Boothroyd | Mar. 11, 1952 |
| 2,648,000 | White | Aug. 4, 1953 |

OTHER REFERENCES

"Principles and Practice of Wave Guides," L. G. H. Huxley, 1947, MacMillan Co., pp. 198-203. (Copy in Scientific Library.)